United States Patent
Baldwin et al.

(10) Patent No.: US 11,781,969 B2
(45) Date of Patent: Oct. 10, 2023

(54) CLEAN GAS CURTAIN TO PREVENT PARTICLE BUILDUP DURING CONCENTRATION MEASUREMENT

(71) Applicant: Kidde Technologies, Inc., Wilson, NC (US)

(72) Inventors: Eli Baldwin, Knightdale, NC (US); Mark P. Fazzio, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 294 days.

(21) Appl. No.: 16/951,056

(22) Filed: Nov. 18, 2020

(65) Prior Publication Data

US 2022/0155216 A1    May 19, 2022

(51) Int. Cl.
  *G01N 21/15* (2006.01)
  *G01N 15/06* (2006.01)
  *G01N 21/47* (2006.01)

(52) U.S. Cl.
  CPC ............ *G01N 21/15* (2013.01); *G01N 15/06* (2013.01); *G01N 2015/0693* (2013.01); *G01N 2021/151* (2013.01); *G01N 2021/4742* (2013.01)

(58) Field of Classification Search
  CPC .................. G01N 21/15; G01N 15/06; G01N 2015/0693; G01N 2021/151; G01N 2021/4742
  See application file for complete search history.

(56) References Cited

U.S. PATENT DOCUMENTS

| 1,937,721 A | * | 12/1933 | Walter | G01N 21/15 356/439 |
| 1,937,722 A | * | 12/1933 | Walter | G01N 21/15 15/250.002 |
| 3,200,254 A | | 8/1965 | Van Luik, Jr. et al. | |

(Continued)

FOREIGN PATENT DOCUMENTS

| EP | 0064200 B1 | 7/1987 |
| EP | 1284419 A1 | 2/2003 |
| EP | 3258241 A2 | 12/2017 |

OTHER PUBLICATIONS

Extended European Search Report for EP Application No. 21203295.7, dated Apr. 8, 2022, pp. 1-10.

*Primary Examiner* — Dominic J Bologna
*Assistant Examiner* — Jarreas C Underwood
(74) *Attorney, Agent, or Firm* — CANTOR COLBURN LLP

(57) ABSTRACT

A particle concentration measurement system includes a first window and a second window in a housing. The first window and the second window respectively define a first end and a second end of an interaction region between the first window and the second window. The system also includes a particle-laden gas inlet through a wall of the housing between the first window and the second window. The particle-laden gas inlet introduces particle-laden gas from an environment that includes particles mixed with other materials into the interaction region. A first set of clean gas inlets through the wall of the housing are at different radial positions of the housing and at a first axial location of the housing, and a second set of clean gas inlets through the wall of the housing are at different radial positions of the housing and at a second axial location of the housing.

14 Claims, 4 Drawing Sheets

(56) References Cited

U.S. PATENT DOCUMENTS

| | | | | |
|---|---|---|---|---|
| 3,251,999 | A | * | 5/1966 | Middleton ............ G01N 21/15 |
| | | | | 340/630 |
| 3,628,028 | A | * | 12/1971 | Thorsheim ............ G01N 21/15 |
| | | | | 250/576 |
| 4,784,491 | A | * | 11/1988 | Penney .................. G01B 11/00 |
| | | | | 219/121.84 |
| 4,896,047 | A | * | 1/1990 | Weaver ................ G01N 21/534 |
| | | | | 250/573 |
| 4,966,462 | A | | 10/1990 | Novick |
| 5,191,878 | A | * | 3/1993 | Iida ........................ A61B 1/126 |
| | | | | 600/157 |
| 5,630,795 | A | * | 5/1997 | Kuramoto .......... A61B 1/00137 |
| | | | | 604/35 |
| 5,807,750 | A | * | 9/1998 | Baum .................... G01N 21/31 |
| | | | | 436/171 |
| 6,369,890 | B1 | | 4/2002 | Harley |
| 6,421,127 | B1 | * | 7/2002 | McAndrew ............ B08B 17/02 |
| | | | | 356/440 |
| 6,476,911 | B1 | | 11/2002 | Rose |
| 7,319,524 | B2 | | 1/2008 | Friedrichs |
| 8,004,684 | B2 | | 8/2011 | Powell et al. |
| 9,111,427 | B2 | | 8/2015 | Knox et al. |
| 9,709,491 | B1 | * | 7/2017 | Murphy ................ G01N 21/534 |
| 2010/0073679 | A1 | * | 3/2010 | Larking ................ G01N 21/85 |
| | | | | 356/437 |
| 2012/0236323 | A1 | * | 9/2012 | Kuoppa ................ G01N 21/85 |
| | | | | 356/634 |
| 2021/0033524 | A1 | * | 2/2021 | Floor ...................... G01L 13/00 |

\* cited by examiner

CLEAN GAS CURTAIN TO PREVENT PARTICLE BUILDUP DURING CONCENTRATION MEASUREMENT

BACKGROUND

Exemplary embodiments pertain to the art of fire suppression and, in particular, to a clean gas curtain to prevent particle buildup during a concentration measurement.

Fire suppression systems deploy agents to extinguish a fire. Halon, a liquified compressed gas that stops the spread of fire by chemically disrupting combustion, is being replaced as a fire-suppression agent due to its contribution to ozone depletion. Alternative fire suppressive agents include dry solid particulates that are dispersed within an environment. The distribution and concentration of the particulates within the environment are factors in the effectiveness of the fire suppression system. As such, measurement of the concentration of a fire suppression agent is an important part of the fire suppression effort using these particulates.

BRIEF DESCRIPTION

In one embodiment, a particle concentration measurement system includes a first window and a second window in a housing. The first window and the second window respectively define a first end and a second end of an interaction region between the first window and the second window. A particle-laden gas inlet is through a wall of the housing between the first window and the second window. The particle-laden gas inlet introduces particle-laden gas from an environment that includes particles mixed with other materials into the interaction region. A first set of clean gas inlets is through the wall of the housing. Each clean gas inlet of the first set of clean gas inlets is at a different radial position of the housing and at a first axial location of the housing. A second set of clean gas inlets is through the wall of the housing. Each clean gas inlet of the second set of clean gas inlets is at a different radial position of the housing and at a second axial location of the housing.

Additionally or alternatively, in this or other embodiments, the first axial location of the housing associated with the first set of clean gas inlets is between the first window and the particle-laden gas inlet.

Additionally or alternatively, in this or other embodiments, the first set of clean gas inlets is slanted to direct clean gas through the first set of clean gas inlets toward the first window.

Additionally or alternatively, in this or other embodiments, the second axial location of the housing associated with the second set of clean gas inlets is between the second window and the particle-laden gas inlet.

Additionally or alternatively, in this or other embodiments, the second set of clean gas inlets is slanted to direct clean gas through the second set of clean gas inlets toward the second window.

Additionally or alternatively, in this or other embodiments, the system also includes a source of pressurized gas without the particles to introduce the pressurized gas into one or more of the first set of clean gas inlets or into one or more of the second set of clean gas inlets.

Additionally or alternatively, in this or other embodiments, the system also includes a filter to filter out the particles from the particle-laden gas of the environment prior to its entry into a clean gas inlet of the first set of clean gas inlets or the second set of clean gas inlets.

Additionally or alternatively, in this or other embodiments, the system also includes a first circumferential groove in an exterior surface of the housing within which the first set of clean gas inlets is formed and a second circumferential groove in the exterior surface of the housing within which the second set of clean gas inlets is formed.

Additionally or alternatively, in this or other embodiments, the system also includes a light source to emit incident light into the housing via a fiber optic cable. The incident light enters the interaction region through the first window and interacts with the particle-laden gas in the interaction region, a detector configured to detect light intensity following interaction in the interaction region. A controller determines a concentration of the particles in the particle-laden gas in the interaction region based on the intensity measured by the detector.

Additionally or alternatively, in this or other embodiments, the particles act as a fire suppression agent.

In another embodiment, a method of assembling a particle concentration measurement system includes disposing a first window and a second window in a housing such that the first window and the second window respectively defining a first end and a second end of an interaction region between the first window and the second window. The method also includes forming a particle-laden gas inlet through a wall of the housing between the first window and the second window. The particle-laden gas inlet introduces particle-laden gas from an environment that includes particles mixed with other materials into the interaction region. A first set of clean gas inlets is formed through the wall of the housing, each clean gas inlet of the first set of clean gas inlets being at a different radial position of the housing and at a first axial location of the housing. A second set of clean gas inlets is formed through the wall of the housing, each clean gas inlet of the second set of clean gas inlets being at a different radial position of the housing and at a second axial location of the housing.

Additionally or alternatively, in this or other embodiments, the first axial location of the housing associated with the first set of clean gas inlets is between the first window and the particle-laden gas inlet.

Additionally or alternatively, in this or other embodiments, the forming the first set of clean gas inlets includes creating slanted inlets to direct clean gas through the first set of clean gas inlets toward the first window.

Additionally or alternatively, in this or other embodiments, the second axial location of the housing associated with the second set of clean gas inlets is between the second window and the particle-laden gas inlet.

Additionally or alternatively, in this or other embodiments, the forming the second set of clean gas inlets includes creating slanted inlets to direct clean gas through the second set of clean gas inlets toward the second window.

Additionally or alternatively, in this or other embodiments, the method also includes arranging a source of pressurized gas without the particles to introduce the pressurized gas into one or more of the first set of clean gas inlets or into one or more of the second set of clean gas inlets.

Additionally or alternatively, in this or other embodiments, the method also includes disposing a filter to filter out the particles from the particle-laden gas of the environment prior to its entry into a clean gas inlet of the first set of clean gas inlets or the second set of clean gas inlets.

Additionally or alternatively, in this or other embodiments, the method also includes fabricating a first circumferential groove in an exterior surface of the housing within which to form the first set of clean gas inlets and fabricating a second circumferential groove in the exterior surface of the housing within which to form the second set of clean gas inlets.

Additionally or alternatively, in this or other embodiments, the method also includes arranging a light source to emit incident light into the housing via a fiber optic cable, wherein the incident light enters the interaction region through the first window and interacts with the particle-laden gas in the interaction region, arranging a detector to detect light intensity following interaction in the interaction region, and configuring a controller to determine a concentration of the particles in the particle-laden gas in the interaction region based on the intensity measured by the detector.

Additionally or alternatively, in this or other embodiments, the particles act as a fire suppression agent.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, the distribution and concentration of dry solid particulates used for fire suppression can affect the result of the suppressive effort. Thus, a fire suppression agent concentration measurement device may be used to measure concentration in real time. A set of such devices may be used in different areas of a given environment to also determine distribution. The measurements may be used to control the release of additional fire suppression agent as needed, for example.

One approach to measuring the concentration of fire suppression agent in the environment involves transmitting light into an interaction region in which the light interacts with a sample of gas from the environment. The interaction region may be defined by two windows. The introduction of light into the interaction region is through a first window. The intensity of the light that has interacted with the gas from the environment is measured, and a decrease in the intensity is correlated to a concentration of the fire suppression agent in the gas. Over time, the introduction of gas with fire suppressive particles into the interaction region between the two windows may result in particle buildup on the windows. This buildup impedes light transmission through the windows, thus preventing the accurate measurement of the concentration of the fire suppression agent.

Embodiments of the systems and methods detailed herein relate to a clean gas curtain to prevent particle buildup during a concentration measurement. As detailed, the clean gas curtain is formed at each of the two ends of the interaction region, adjacent to each window. This clean gas curtain is formed, according to alternate embodiments, in order to prevent particles of the suppressive agent from contacting and adhering to the windows. According to one exemplary embodiment, a clean gas source introduces air at the two ends of the interaction region. According to another exemplary embodiment, a filter filters out the fire suppressant particles prior to gas entering the two ends of the interaction region. The clean gas curtain addresses the issues of inaccuracy created by particle buildup on the windows without requiring cleaning.

Figure 1:
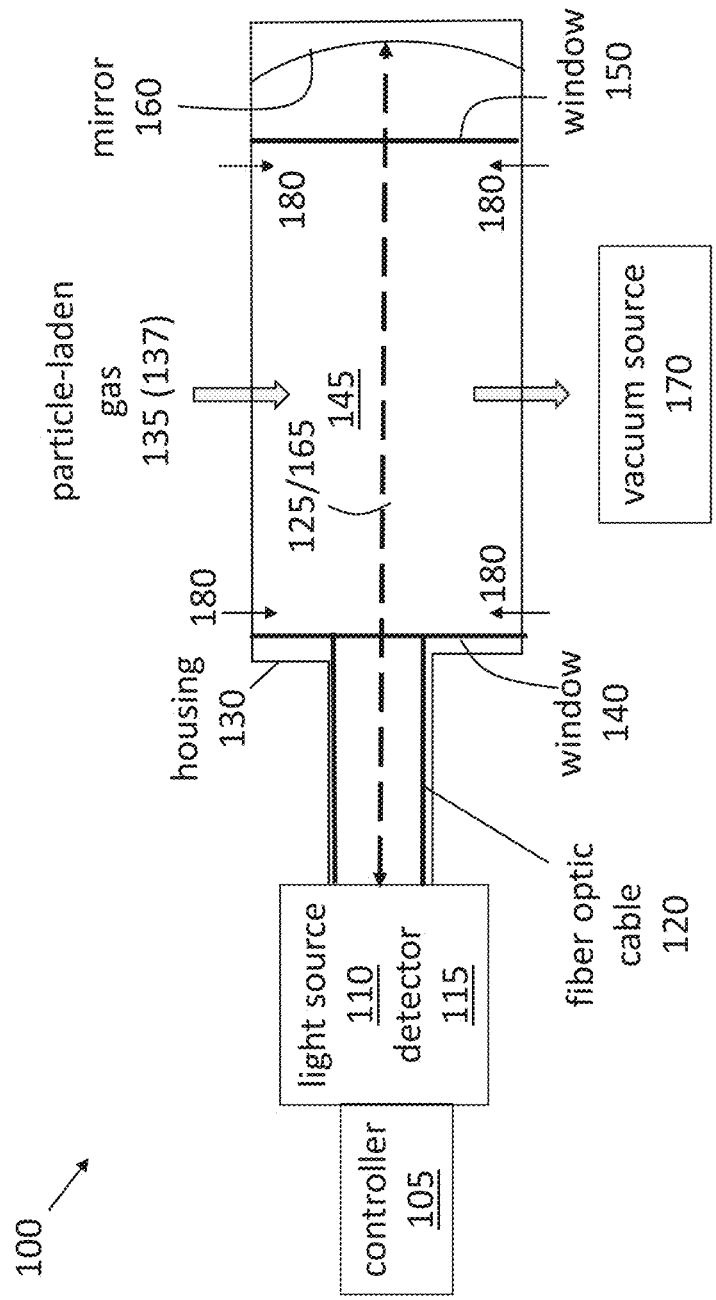
FIG. 1 is a cross-sectional view of a particle concentration measurement device with a curtain of clean gas at each end of an interaction region according to one or more embodiments.

FIG. 1 is a cross-sectional view of a particle concentration measurement device 100 with a curtain of clean gas 180 at each end of an interaction region 145 according to one or more embodiments. The particle concentration measurement device 100 is disposed in an environment in which a solid particle fire suppression agent is dispersed, for example. The particles 137 mix with air and other materials in the environment to create particle-laden gas 135. The particle concentration measurement device 100 measures the concentration of the particles 137 of fire suppression agent in the particle-laden gas 135 in the environment. A light source 110 emits incident light 125 via a fiber optic cable 120 into a tube-like housing 130.

The housing 130 includes an interaction region 145 that is defined by a lens or window 140 on one end and another lens or window 150 on the other end. The particle-laden gas 135 from the environment is introduce into the interaction region 145 of the tube where it interacts with the incident light 125 that enters the interaction region 145 through the first window 140. The light exits the interaction region 145 via the second window 150 and is reflected by a mirror 160 according to the exemplary embodiment. Reflected light 165 then re-enters the interaction region 145 through the second window 150 and exits the housing 130 through the first window 140. The reflected light 165 and, more specifically, intensity of the reflected light 165 is detected by a detector 115. A controller 105 then uses the measured intensity of the reflected light 165 to determine the concentration of the particles 137 of fire suppression agent in the particle-laden gas 135. A mapping of measured intensity to concentration may be in the form of a look-up table, for example.

As shown, a vacuum source 170 may be used to pull the particle-laden gas 135 out of the interaction region 145 of the housing 130. According to prior arrangements, any lingering particles 137 of the fire suppression agent remaining in the interaction region 145 may have come into contact with one of the windows 140, 150 and adhered thereto. This is now prevented by the curtain of clean gas 180 according to one or more embodiments. Specifically, clean gas 180, which does not include any particles 137 of the fire suppression agent or includes a much-reduced concentration of particles 137 of the fire suppression agent, as compared to the particle-laden gas 135, is introduced into the interaction region 145 adjacent to each of the windows 140, 150, as shown in FIG. 1. The curtain of clean gas 180 adjacent to the windows 140, 150 prevents particles 137 from building up on the windows 140, 150.

Figure 2:
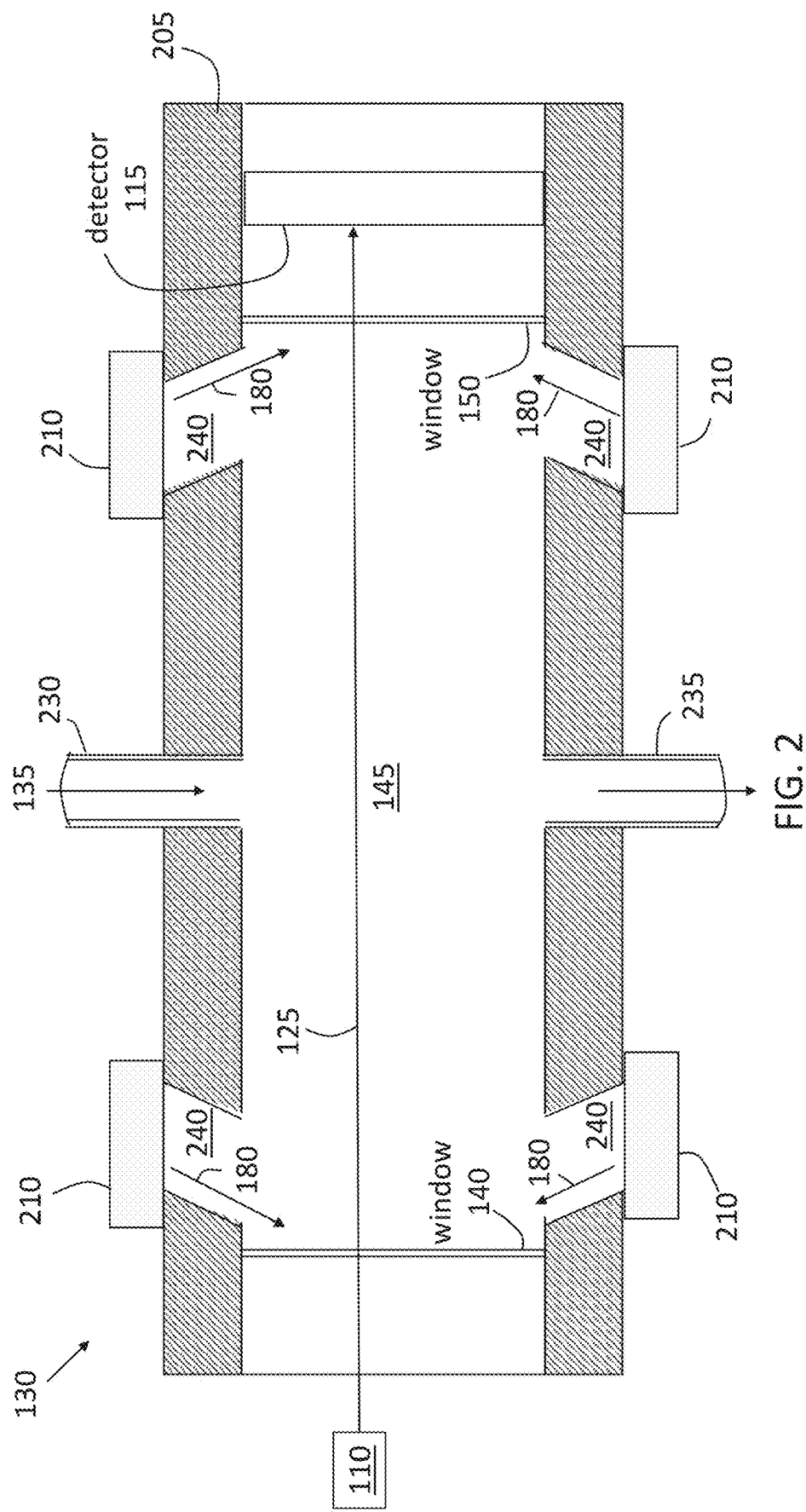
FIG. 2 is a cross-sectional view of aspects of the housing of the particle concentration measurement device according to an exemplary embodiment.

FIG. 2 is a cross-sectional view of aspects of the housing 130 of the particle concentration measurement device 100 according to an exemplary embodiment. According to the exemplary embodiment shown in FIG. 2, there is no mirror 160, and the detector 115 is not collocated with the light source 110. Instead, incident light 125 enters the interaction region 145 through the first window 140, interacts with the particle-laden gas 135 in the interaction region 145, exits the interaction region 145 through the second window 150, and is detected by the detector 115. The controller 105 may be collocated with the detector 115 or the intensity determined by the detector 115 may be conveyed to the controller 105.

Figure 4:
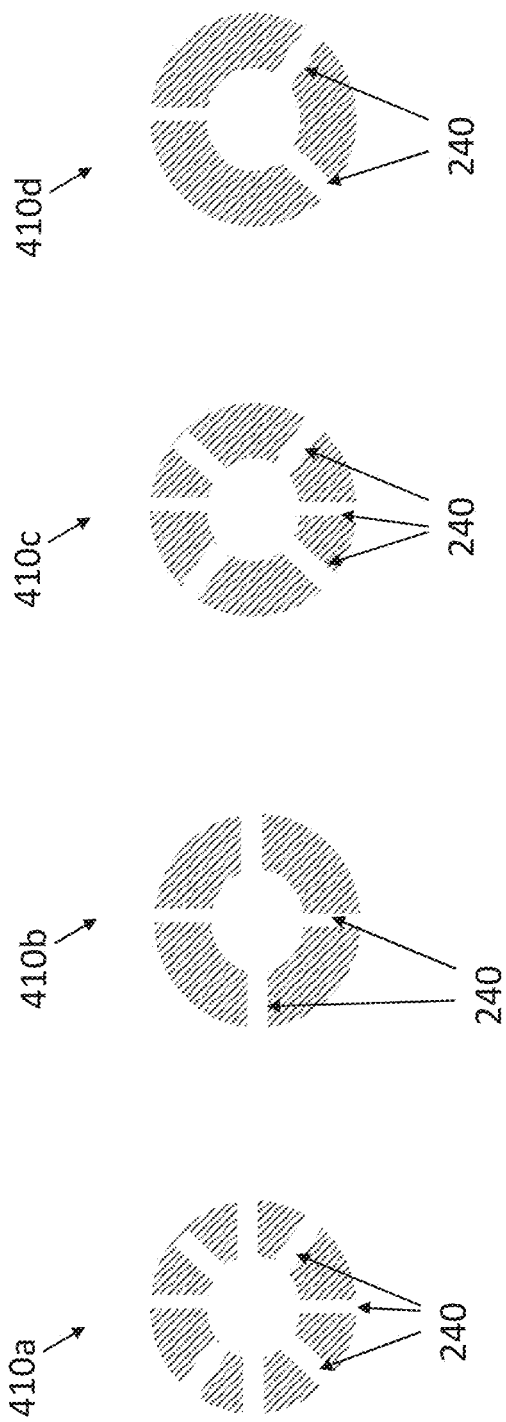
FIG. 4 is a view of cross-section A-A indicated in FIG. 3.

The cross-section of the housing wall 205 that is cut to reveal the interaction region 145 defined by the windows 140, 150 is shown. An inlet 230 for the particle-laden gas 135 and an outlet 235, which may couple to the vacuum source 170 shown in FIG. 1, are shown intersecting the housing 130 (specifically the tube wall 205). Clean gas inlets 240 in the housing 130 for the clean gas 180 are also indicated in the housing wall 205. According to the exemplary embodiment shown in FIG. 2, the clean gas inlets 240 are angled to direct the clean gas 180 to one of the windows 140, 150. According to alternate embodiments, the clean gas inlets 240 are formed by cutting straight, rather than at an angle, through the housing wall 205. FIG. 4 details exemplary embodiments of the clean gas inlets 240.

As shown in FIG. 2, a source of the clean gas 180 is a clean gas source 210 according to exemplary embodiments. The clean gas source 210 at each clean gas inlet 240 may be separate or may be coupled to a single source. The clean gas source 210 may supply a stream of pressurized air from a dry air tank as the clean gas 180. The clean gas source 210 supplying clean gas 180 through the clean gas inlets 240 may be thought of as generating an active clean gas curtain covering each of the windows 140, 150. According to alternate embodiments discussed with reference to FIG. 3, the source of the clean gas 180 is a filter 220 that filters out particles 137 of the fire suppression agent from the particle-laden gas 135 before it enters the clean gas inlets 240. The filter 220 resulting in the clean gas 180 in each of the clean gas inlets 240 may be thought of as creating a passive clean gas curtain at each of the windows 140, 150. A vacuum (e.g., vacuum source 170) may be used with the filters 220 at each clean gas inlet 240.

Figure 3:
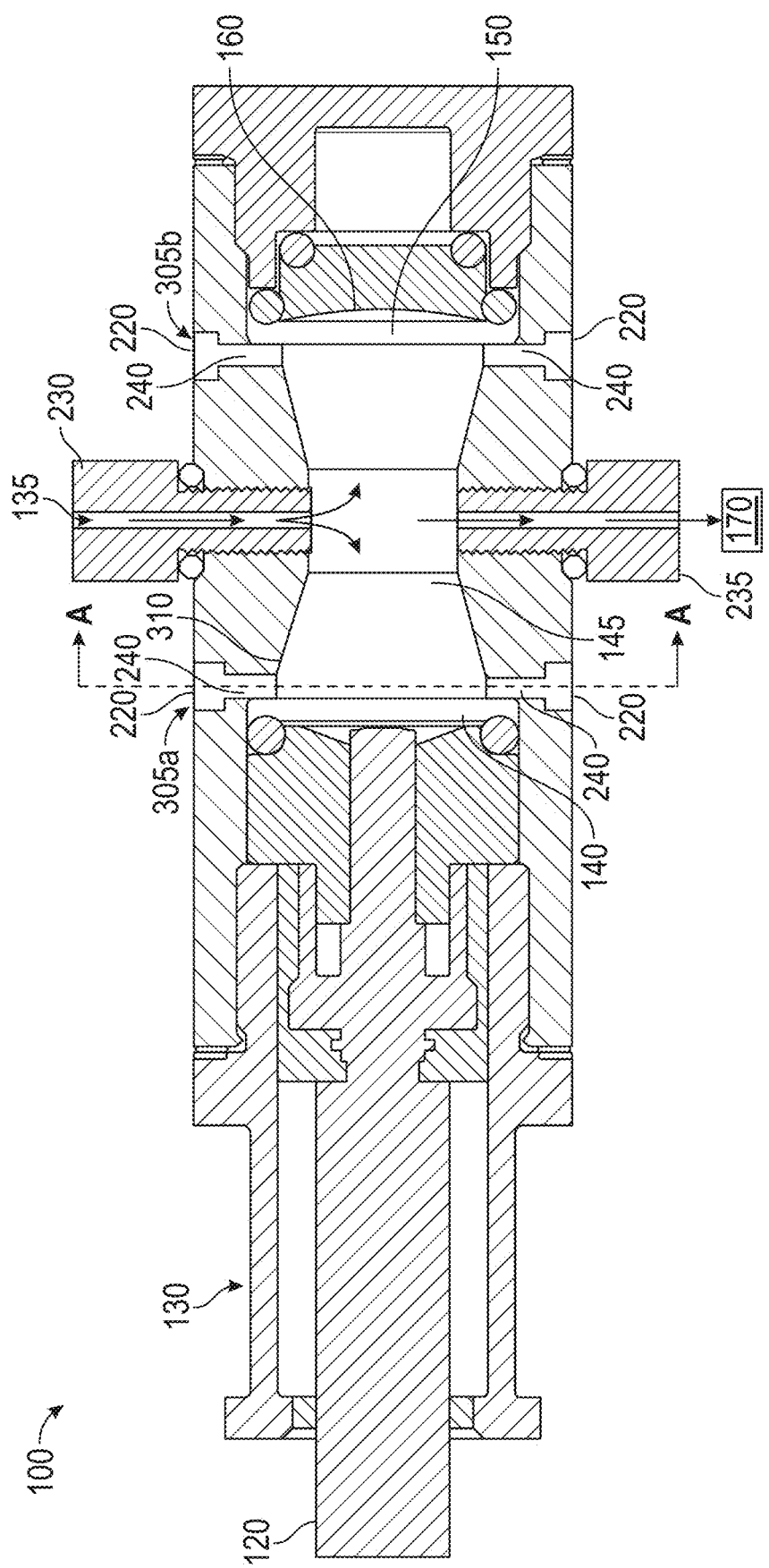
FIG. 3 is a cross-sectional view detailing features of the housing of a particle concentration measurement device according to an exemplary embodiment.

FIG. 3 is a cross-sectional view detailing features of the housing 130 of a particle concentration measurement device 100 according to an exemplary embodiment. The view of FIG. 3 details the interaction region 145 and shows an exemplary embodiment of the clean gas inlets 240. The housing 130 includes cavities 310 on either side of the path of the particle-laden gas 135 through the interaction region 145. Each clean gas inlet 240 is within a circumferential groove 305 that encircles the outer surface of the housing 130. Two grooves 305a, 305b (generally referred to as 305) are shown for the exemplary housing 130 of FIG. 3.

That is, the two clean gas inlets 240 that are adjacent to the first window 140 are formed in one circumferential groove 305a. The filter 220 that is shown at each of these two clean gas inlets 240 filters out particles 137 from the particle-laden gas 135 and creates a curtain of clean gas 180 adjacent to the first window 140. The filter 220 at each of these two clean gas inlets 240 adjacent to the window 140 may be part of a circumferential filter 220 that fits in the circumferential groove 305a. Similarly, the two clean gas inlets 240 that are adjacent to the second window 150 are formed in another circumferential groove 305b. The filter 220 that is shown at each of these two clean gas inlets 240 filters out particles 137 to create a curtain of clean gas 180 adjacent to the second window 150. One circumferential filter 220 may be disposed in the groove 305b. This arrangement of the filter 220 in each groove 305 may prevent the filter 220 from clogging locally over each clean gas inlet 240. Different exemplary embodiments for the cross-section A-A through the housing 130 are shown in FIG. 4.

FIG. 4 is a cross-sectional view through A-A indicated in FIG. 3. The view in FIG. 4 is a view into the housing 130 from the perspective of the fiber optic cable 120, for example. The cross-section A-A is indicated at an axial location of the housing 130 adjacent to the window 140 that reveals the radial positions of clean gas inlets 240 adjacent to the window 140. As FIGS. 1-3 indicate, one set of clean gas inlets 240 is adjacent to the window 140 (axially between the window 140 and the inlet 230 for the particle-laden gas 135). Another set of clean gas inlets 240 is adjacent to the window 150 (axially between the inlet 230 for the particle-laden gas 135 and the window 150). The different radial positions of a given set of clean gas inlets 240, according to the exemplary embodiments 410a, 410b, 410c, 410d shown in FIG. 4 and additional embodiments, facilitate creating the curtain (i.e., covering) of clean gas 180 at the corresponding window 140, 150.

Four exemplary embodiments 410a, 410b, 410c, 410d are shown. While the cross-section A-A is indicated in FIG. 3, the cross-sectional view at an axial location of the housing 130 adjacent to the window 150 will also reveal radial positions of the clean gas inlets 240. According to alternate embodiments, the radial arrangement of clean gas inlets 240 adjacent to the window 140 may be the same as or different than the radial arrangement of clean gas inlets 240 adjacent to the window 150. The exemplary embodiments shown in FIG. 4 are not intended to be limiting but, instead, to indicate that any number of clean gas inlets 240 in any arrangement may be used adjacent to each window 140, 150.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A particle concentration measurement system comprising:
   a first window and a second window in a housing, the first window and the second window respectively defining a first end and a second end of an interaction region between the first window and the second window;
   a particle-laden gas inlet through a wall of the housing between the first window and the second window, the particle-laden gas inlet being configured to introduce particle-laden gas from an environment that includes particles mixed with other materials into the interaction region;

a first set of clean gas inlets through the wall of the housing, each clean gas inlet of the first set of clean gas inlets being at a different radial position of the housing and at a first axial location of the housing; and a second set of clean gas inlets through the wall of the housing, each clean gas inlet of the second set of clean gas inlets being at a different radial position of the housing and at a second axial location of the housing, wherein: a curtain of clean gas is created in the interaction region adjacent to each of the windows that prevents particles from building up on the windows, the curtain being formed by the clean gas inlets that are:

circumferential grooves that encircles an outer surface of the housing, and filters at each of the two clean gas inlets adjacent to the windows are part of a circumferential filter that is located in each of the circumferential grooves, wherein the filter filters out particles from the particle-laden gas of the environment prior to its entry into a clean gas inlet of the first set of clean gas inlets or the second set of clean gas inlets;

a light source configured to emit incident light into the housing via a fiber optic cable, wherein the incident light enters the interaction region through the first window and interacts with the particle-laden gas in the interaction region;

a detector configured to detect light intensity following interaction in the interaction region, and a controller configured to determine a concentration of the particles in the particle-laden gas in the interaction region based on the intensity measured by the detector.

2. The system according to claim 1, wherein the first axial location of the housing associated with the first set of clean gas inlets is between the first window and the particle-laden gas inlet.

3. The system according to claim 2, wherein the first set of clean gas inlets is slanted to direct clean gas through the first set of clean gas inlets toward the first window.

4. The system according to claim 1, wherein the second axial location of the housing associated with the second set of clean gas inlets is between the second window and the particle-laden gas inlet.

5. The system according to claim 4, wherein the second set of clean gas inlets is slanted to direct clean gas through the second set of clean gas inlets toward the second window.

6. The system according to claim 1, further comprising a source of pressurized gas without the particles configured to introduce the pressurized gas into one or more of the first set of clean gas inlets or into one or more of the second set of clean gas inlets.

7. The system according to claim 1, wherein the system is configured to measure particles that act as a fire suppression agent.

8. A method of assembling a particle concentration measurement system, the method comprising:

disposing a first window and a second window in a housing such that the first window and the second window respectively defining a first end and a second end of an interaction region between the first window and the second window;

forming a particle-laden gas inlet through a wall of the housing between the first window and the second window, the particle-laden gas inlet being configured to introduce particle-laden gas from an environment that includes particles mixed with other materials into the interaction region;

forming a first set of clean gas inlets through the wall of the housing, each clean gas inlet of the first set of clean gas inlets being at a different radial position of the housing and at a first axial location of the housing; and forming a second set of clean gas inlets through the wall of the housing, each clean gas inlet of the second set of clean gas inlets being at a different radial position of the housing and at a second axial location of the housing, wherein a curtain of clean gas is created in the interaction region adjacent to each of the windows that prevents particles from building up on the windows, the curtain being formed by the clean gas inlets that are:

circumferential grooves that encircles an outer surface of the housing, and filters at each of the two clean gas inlets adjacent to the windows are part of a circumferential filter that fits is located in each of the circumferential grooves, wherein the filter filters out particles from the particle-laden gas of the environment prior to its entry into a clean gas inlet of the first set of clean gas inlets or the second set of clean gas inlets;

arranging a light source to emit incident light into the housing via a fiber optic cable, wherein the incident light enters the interaction region through the first window and interacts with the particle-laden gas in the interaction region;

arranging a detector to detect light intensity following interaction in the interaction region; and configuring a controller to determine a concentration of the particles in the particle-laden gas in the interaction region based on the intensity measured by the detector.

9. The method according to claim 8, wherein the first axial location of the housing associated with the first set of clean gas inlets is between the first window and the particle-laden gas inlet.

10. The method according to claim 9, wherein the forming the first set of clean gas inlets includes creating slanted inlets to direct clean gas through the first set of clean gas inlets toward the first window.

11. The method according to claim 8, wherein the second axial location of the housing associated with the second set of clean gas inlets is between the second window and the particle-laden gas inlet.

12. The method according to claim 11, wherein the forming the second set of clean gas inlets includes creating slanted inlets to direct clean gas through the second set of clean gas inlets toward the second window.

13. The method according to claim 8, further comprising arranging a source of pressurized gas without the particles to introduce the pressurized gas into one or more of the first set of clean gas inlets or into one or more of the second set of clean gas inlets.

14. The method according to claim 8, wherein the system is configured to measure particles that act as a fire suppression agent.

* * * * *